Dec. 7, 1943.                F. E. BOLL                2,336,390
              COMBINATION SWEEP RAKE AND STACKER
                   Filed April 19, 1943         5 Sheets-Sheet 1

Inventor
Frank E. Boll
By Clarence A. O'Brien
and Harvey B. Jacobson
Attorneys

Dec. 7, 1943.     F. E. BOLL     2,336,390
COMBINATION SWEEP RAKE AND STACKER
Filed April 19, 1943     5 Sheets-Sheet 2

Inventor
Frank E. Boll
By Clarence A. O'Brien
and Harvey B. Jacobson
Attorneys

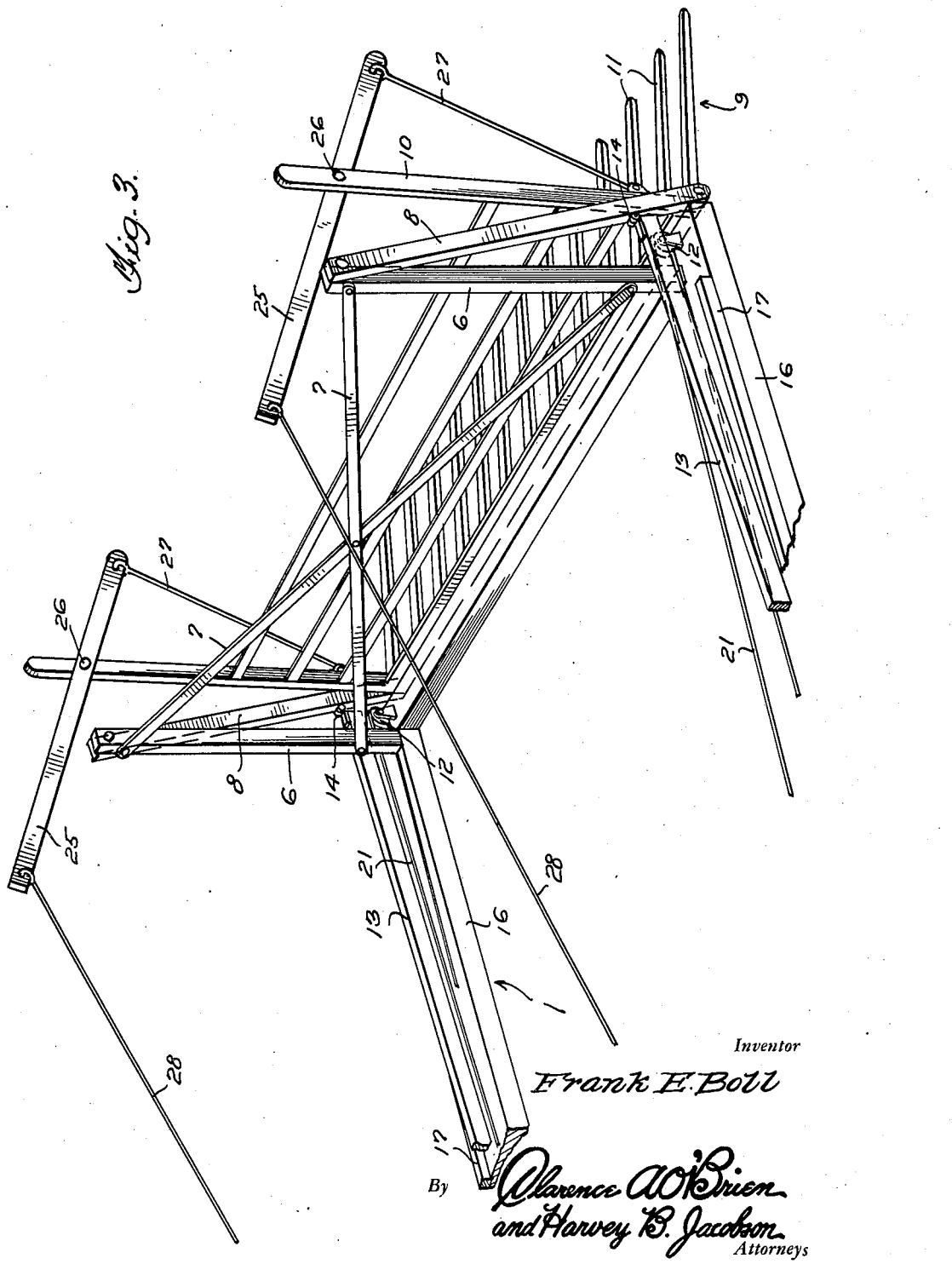

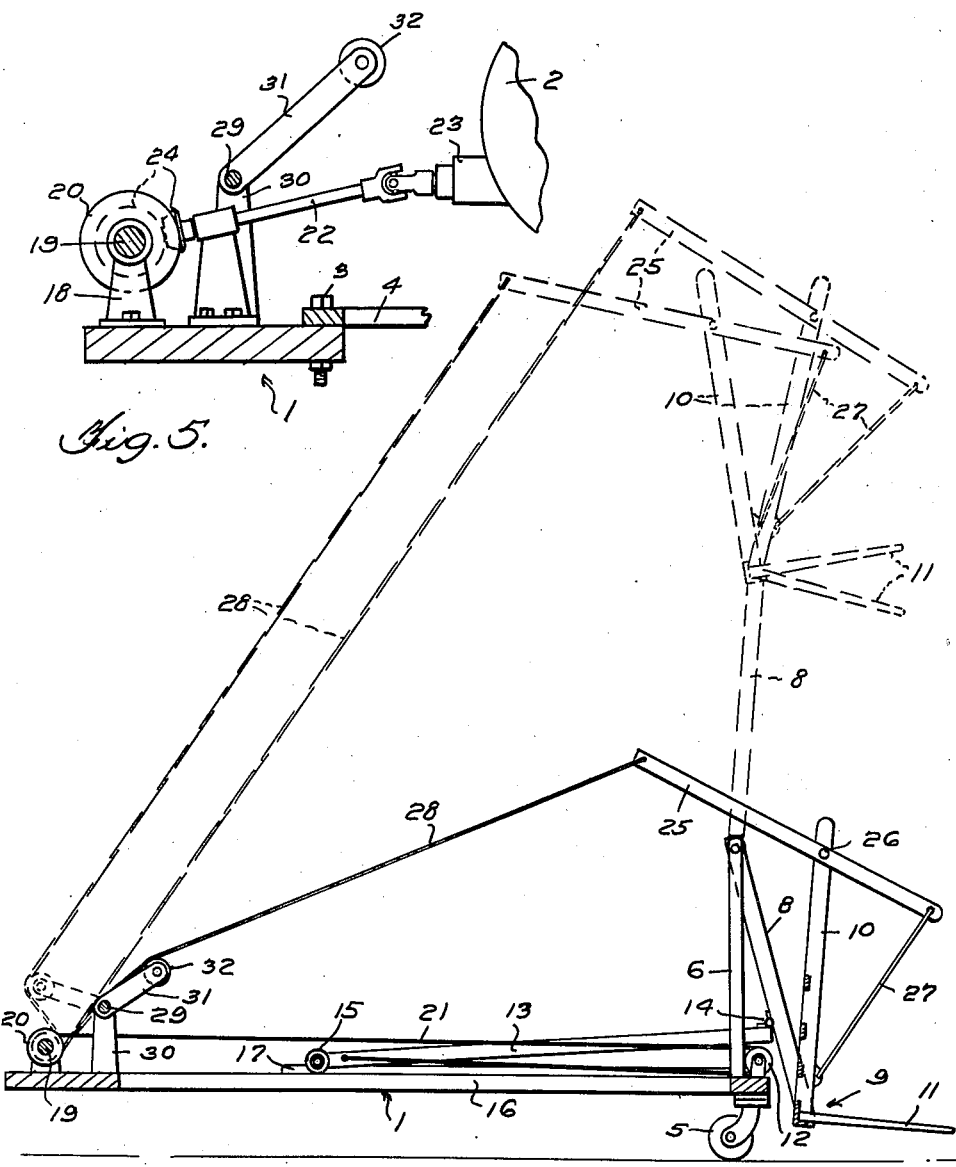

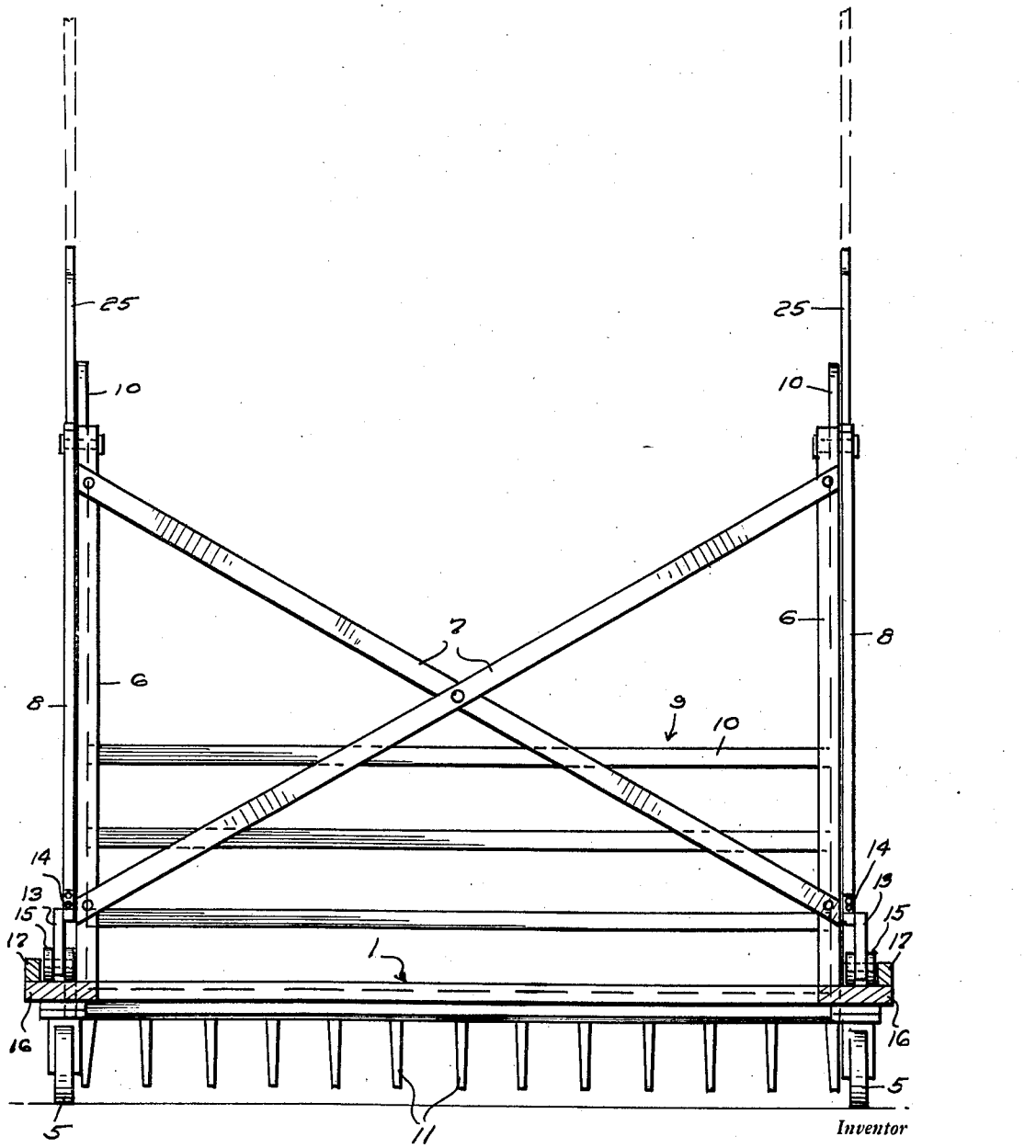

Patented Dec. 7, 1943

2,336,390

UNITED STATES PATENT OFFICE 2,336,390

COMBINATION SWEEP RAKE AND STACKER

Frank E. Boll, Minneapolis, Minn.

Application April 19, 1943, Serial No. 483,649

1 Claim. (Cl. 214—140)

The present invention relates to new and useful improvements in combination sweep rakes and stackers and has for one of its important objects to provide, in a manner as hereinafter set forth, a device of this character which is adapted to be expeditiously mounted for operation on a conventional tractor and driven from the usual power take off thereof without the necessity of making material structural alterations in said tractor.

Another very important object of the invention is to provide, in a combination sweep rake and stacker of the type including a vertically movable and rockable rake head, novel means for raising, lowering and controlling said head.

Still another very important object of the invention is to provide a combination sweep rake and stacker of the character described which is adapted to lay the hay on the stack regardless of the height thereof, thus preventing said hay from being blown away by the wind as it is discharged from the machine.

Other objects of the invention are to provide a combination sweep rake and stacker which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a perspective view of the forward portion of the machine.

Figure 4 is a view in longitudinal section through the device, taken substantially on the line 4—4 of Figure 2.

Figure 5 is a view in vertical longitudinal section through the rear portion of the device, taken substantially on the line 5—5 of Figure 2.

Figure 6 is a cross sectional view through an intermediate portion of the device, looking toward the forward end thereof.

Figure 1:
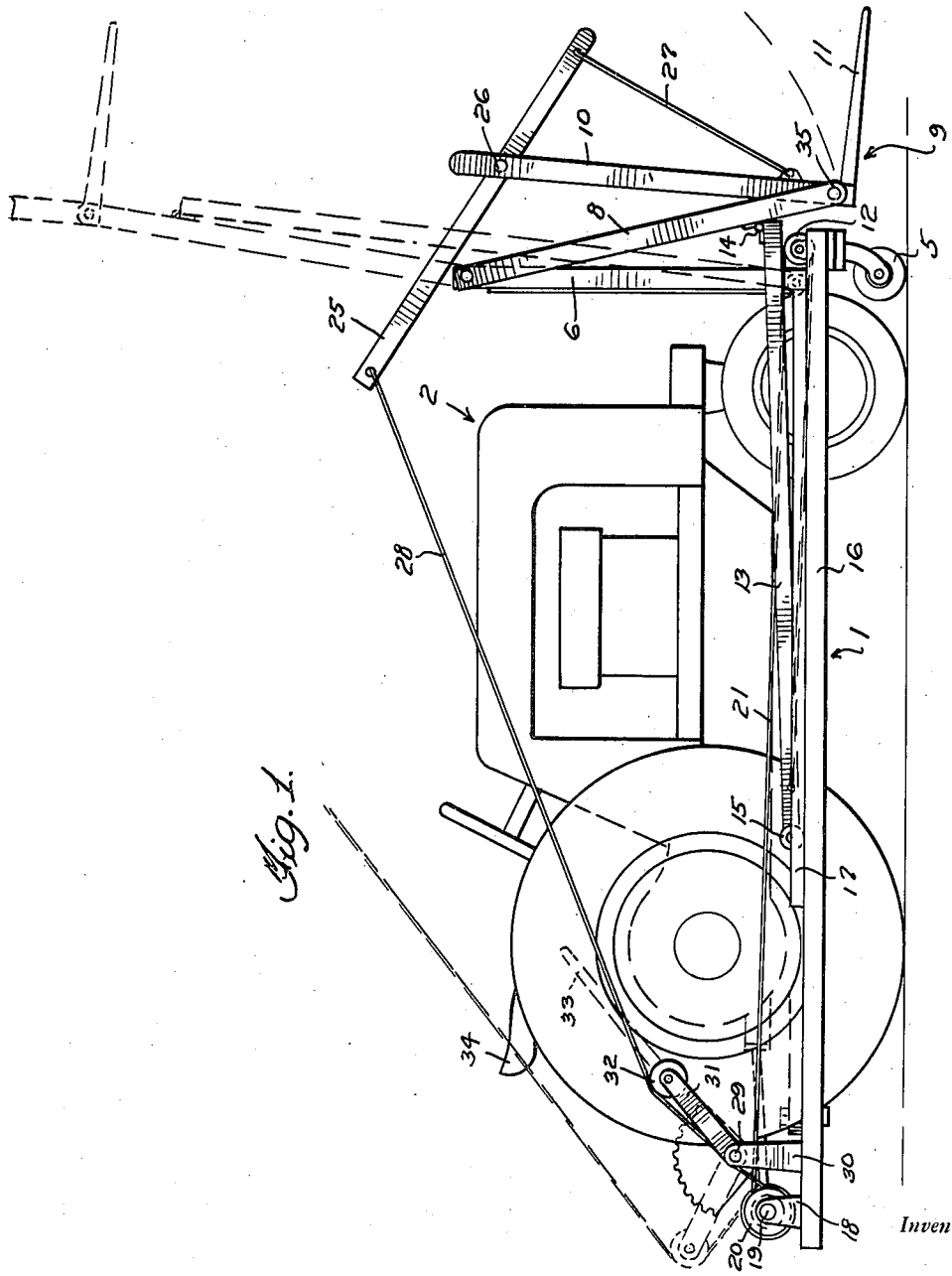
Figure 1 is a view in side elevation of a combination sweep rake and stacker constructed in accordance with the present invention, showing the device mounted on a tractor.
Figure 2:
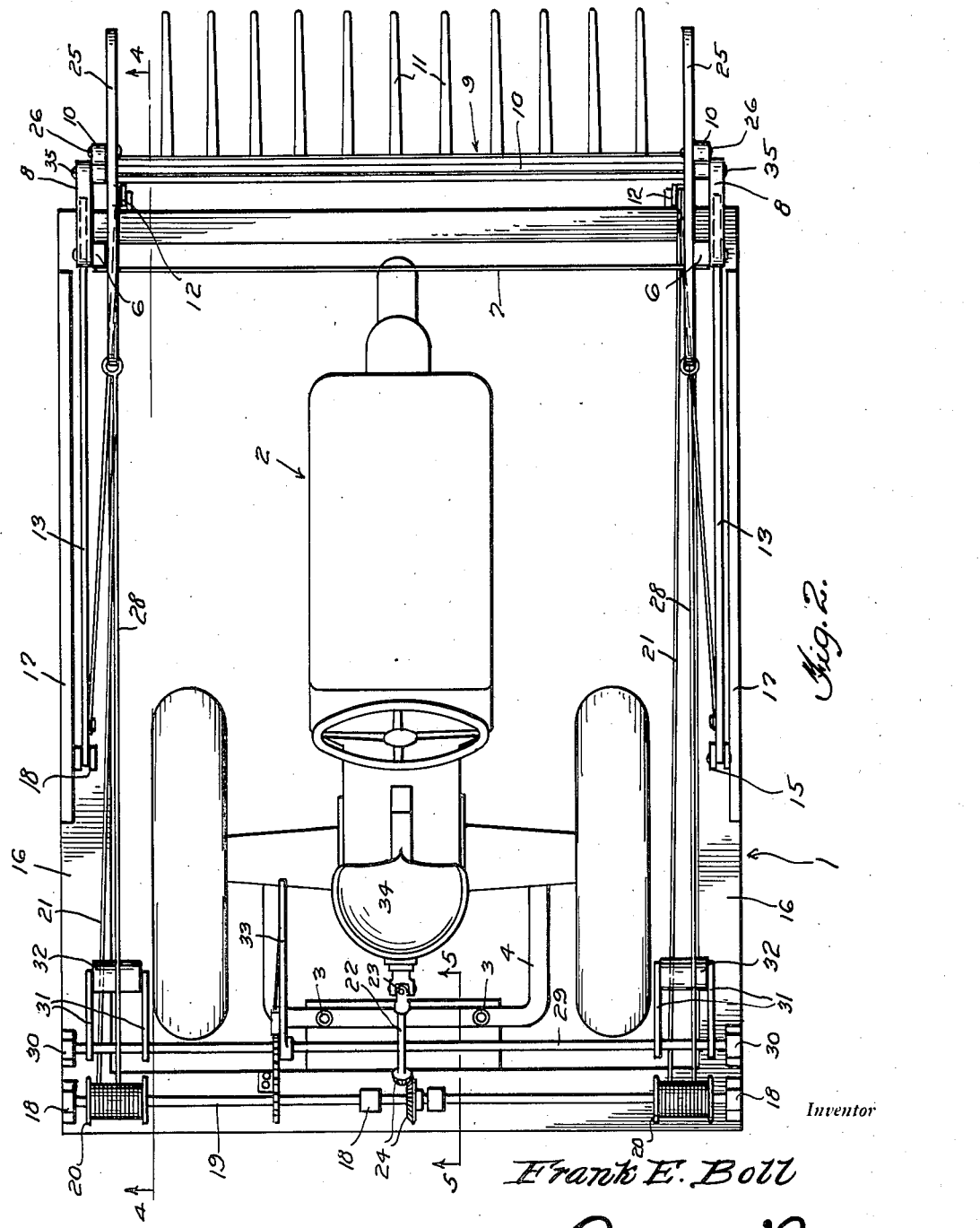
Figure 2 is a top plan view thereof.

Referring now to the drawings it will be seen that the embodiment of the invention which has been illustrated comprises a horizontal frame 1 of suitable dimensions and material. The frame 1 is substantially rectangular in plan and said frame is adapted to receive therein a conventional tractor 2. The rear end of the frame 1 is detachably secured by bolts 3 to the draw bar frame 4 of the tractor 2. Caster wheels 5 support the front end of the frame 1.

Rising from the front end portion of the frame 1 is a pair of posts 6. Suitable braces 7 are provided for the posts 6. Arms 8 are pivotally secured on the upper end portions of the posts 6 for swinging movement in a vertical plane. It will be observed that the arms 8 are adapted to swing forwardly, upwardly and then rearwardly on the posts 6. A rake head 9 is journaled for rocking movement on the free end portions of the arms 8. The rake 9 includes the usual back structure 10, the teeth 11 projecting forwardly from the lower portion of said back structure, etc.

Pulleys 12 are rotatably mounted on the front end portion of the frame 1. Rake elevating bars 13 are hingedly connected at one end, as at 14, to the arms 8. The other ends of the bars 13 have mounted thereon rollers 15 which travel on the side members 16 of the frame 1. Guides 17 are provided on the frame members 16 for the rollers 15.

Journaled in suitable bearings 18 which are provided therefor on the rear end portion of the frame 1 is a transverse shaft 19. Drums 20 are fixed on the end portions of the shaft 19. Cables 21 are trained around the pulleys 12 and have one end connected to the rear end portions of the bars 13. The other ends of the cables 21 are secured to the drums 20 for winding thereon. Thus, the bars 13 are connected to the shaft 19 for actuation thereby for elevating the rake 9. A shaft 22 from the usual power take-off 23 of the tractor 2 drives the shaft 19 through beveled gears 24.

Levers 25 are secured at an intermediate point, as at 26, on the upper portion of the back structure 10 of the rake head 9. Struts in the form of rods 27 connect the forward end portions of the levers 25 to the lower portion of the back structure 10. Cables 28 are connected, at one end, to the other end portions of the levers 25. The cables 28 are secured to the drums 20 for winding thereon in the opposite direction from the cables 21. It will thus be seen that when the cables 21 are being wound on the drums 20, the cables 28 are being paid out and vice versa.

A rockable shaft 29, journaled in bearings 30, parallels the shaft 19 on the rear portion of the frame 1. It will be observed that the shaft 29 is positioned forwardly of the shaft 19. Pairs of arms 31 are fixed on the end portions of the shaft 29. Rollers 32 are journaled between the pairs of arms 31, over which rollers the cables 28 travel. A hand lever 33 is fixed on the shaft 29 for manually actuating the same from the operator's seat 34 of the tractor 2.

It is thought that the operation of the device will be readily apparent from a consideration of the foregoing. Briefly, to lower the teeth 11 for scooping up the hay on the ground as the tractor moves forwardly, the hand lever 33 is swung forwardly for swinging the rollers 32 downwardly away from the cables 28, thus permitting said cables to substantially straighten out for allowing the rake head 9 to rock forwardly on its pivots 35. When the rake is loaded the rollers 32 are swung upwardly and rearwardly for rocking the rake head 9 rearwardly through the medium of the cables 28 thereby swinging the teeth 11 upwardly for retaining the load. The tractor is then driven to the stack and the shaft 19 is actuated in a direction to wind the cables 21 on the drums 20 and unwind the cables 28 from said drums. The cables 21 pull the bars 13 forwardly and said bars swing the arms 8 upwardly with the rake head 9 thereon. The cables 28 are paid out during this operation in a manner to maintain the rake head 9 in substantially the same position as it is elevated. When the rake head 9 has been raised to the desired elevation over the stack, the rollers 32 are again swung forwardly for lowering the teeth 11 in a manner to discharge the hay therefrom and deposit said hay on top of the stack. A suitable clutch, transmission and brake may be interposed in the drive between the power take-off 23 of the tractor 2 and the shaft 19 for stopping and holding the rake head 9 at any desired elevation according to the height of the stack.

It is believed that the many advantages of a combination sweep rake and stacker constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

Having described the invention, what is claimed as new is:

A combination sweep rake and staker comprising a frame for mounting on a tractor, a shaft on the frame for operation from a power take-off of the tractor, drums fixed on said shaft, a pair of arms mounted for swinging movement in a vertical plane on the frame, a rake head rockable in a vertical plane on said arms, cables connecting the arms to the drums for raising thereby, cables connecting the rake head to the drums for supporting said rake head in a predetermined position during the elevation of the arms, the first and second-named cables being wound on the drums in opposite directions, and means for tightening and slackening the second-named cables for rocking the rake head on the arms, said means including a second shaft mounted on the frame, arms fixed on said second-named shaft, rollers journaled on the second-named arms and engaged with said second-named cables, and a hand lever fixed on the second-named shaft.

FRANK E. BOLL.